United States Patent [19]

Henri et al.

[11] Patent Number: 4,729,029

[45] Date of Patent: Mar. 1, 1988

[54] PROCESS AND APPARATUS FOR THE INSERTION OF INSETS INTO THE IMAGE SUPPLIED BY A DIGITAL SCAN CONVERTER

[75] Inventors: Jean C. Henri, Boulogne Billancourt; Jean P. Andrieu, Paris, both of France

[73] Assignee: Thomson-CSF, Paris, France

[21] Appl. No.: 845,317

[22] Filed: Mar. 28, 1986

[30] Foreign Application Priority Data

Apr. 2, 1985 [FR] France ................. 85 05013

[51] Int. Cl.⁴ .................. H04N 7/01; H04N 5/262
[52] U.S. Cl. .................... 358/183; 358/140; 340/731
[58] Field of Search .............. 358/140, 183, 22; 343/5 SC, 6 TV; 342/185, 176, 181; 340/731

[56] References Cited

U.S. PATENT DOCUMENTS

| | | | |
|---|---|---|---|
| 3,976,982 | 8/1976 | Eiselen | 382/44 |
| 4,107,662 | 8/1978 | Endo et al. | 340/731 |
| 4,149,252 | 4/1979 | Miller, Jr. | 358/140 |
| 4,214,269 | 7/1980 | Parker et al. | 358/140 |
| 4,257,044 | 3/1981 | Fukuoka | 340/731 |
| 4,282,550 | 8/1981 | Coviello | 358/160 |
| 4,546,349 | 10/1985 | Prohofsky et al. | 340/731 |
| 4,580,164 | 4/1986 | Andrieu et al. | 358/140 |
| 4,660,043 | 4/1987 | Lachaize et al. | 358/140 |

FOREIGN PATENT DOCUMENTS

2375774  7/1978  France .

OTHER PUBLICATIONS

Gietema, J., "A Digital Scan Converter for Radar Pictures," Philips Telecommunication Review, vol. 37, No. 2, May, 1979, pp. 64-70.

Primary Examiner—Howard W. Britton
Assistant Examiner—John K. Peng
Attorney, Agent, or Firm—Pollock, Vande Sande & Priddy

[57] ABSTRACT

In a digital scan converter particularly for radar images, a process produces a magnified inset during the writing of the video information into the image memory. This makes it possible to increase the definition of the inset. The image memory then contains both the basic image and the insets, the latter being stored with the desired Cartesian coordinates and magnification. The Cartesian coordinates of the points of each inset are obtained by modifying data used for converting the basic image coordinates by the conversion circuits. The desired magnification is obtained by the corresponding modification of the sampling period of the analog video information during its conversion into digital form by the video processing circuits, which makes it possible to increase the definition of the inset compared with that of the basic image.

16 Claims, 10 Drawing Figures

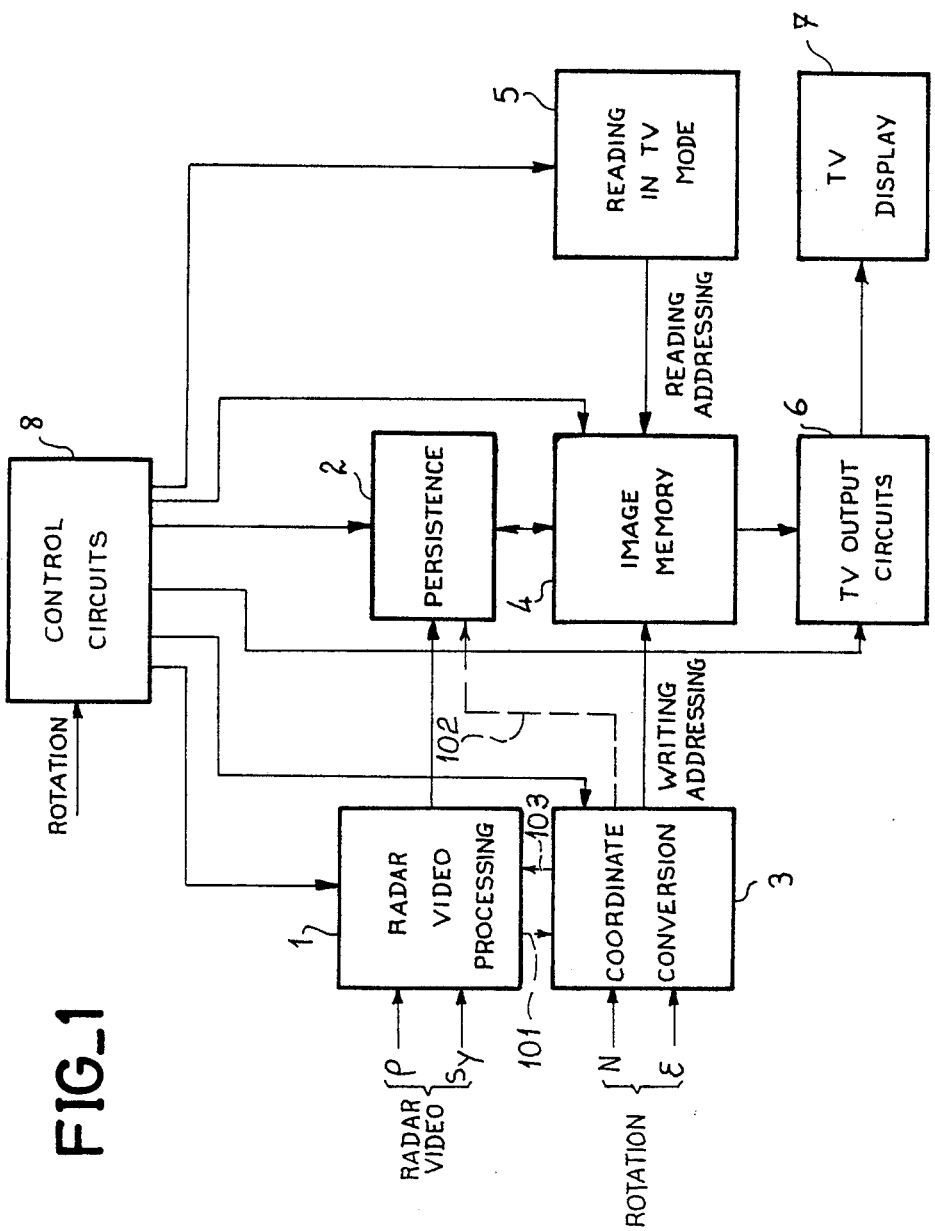
FIG_1

FIG_2-a
FIG_2-b
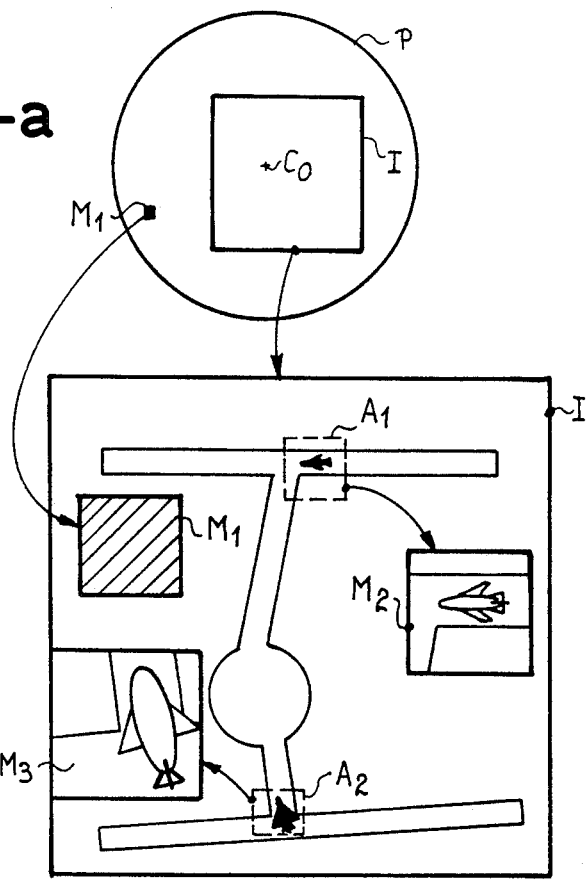
FIG_3
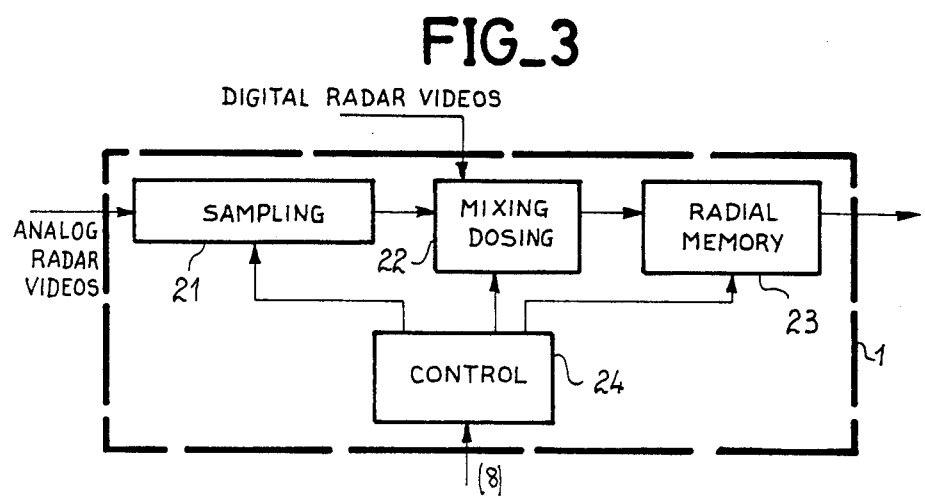

FIG_4
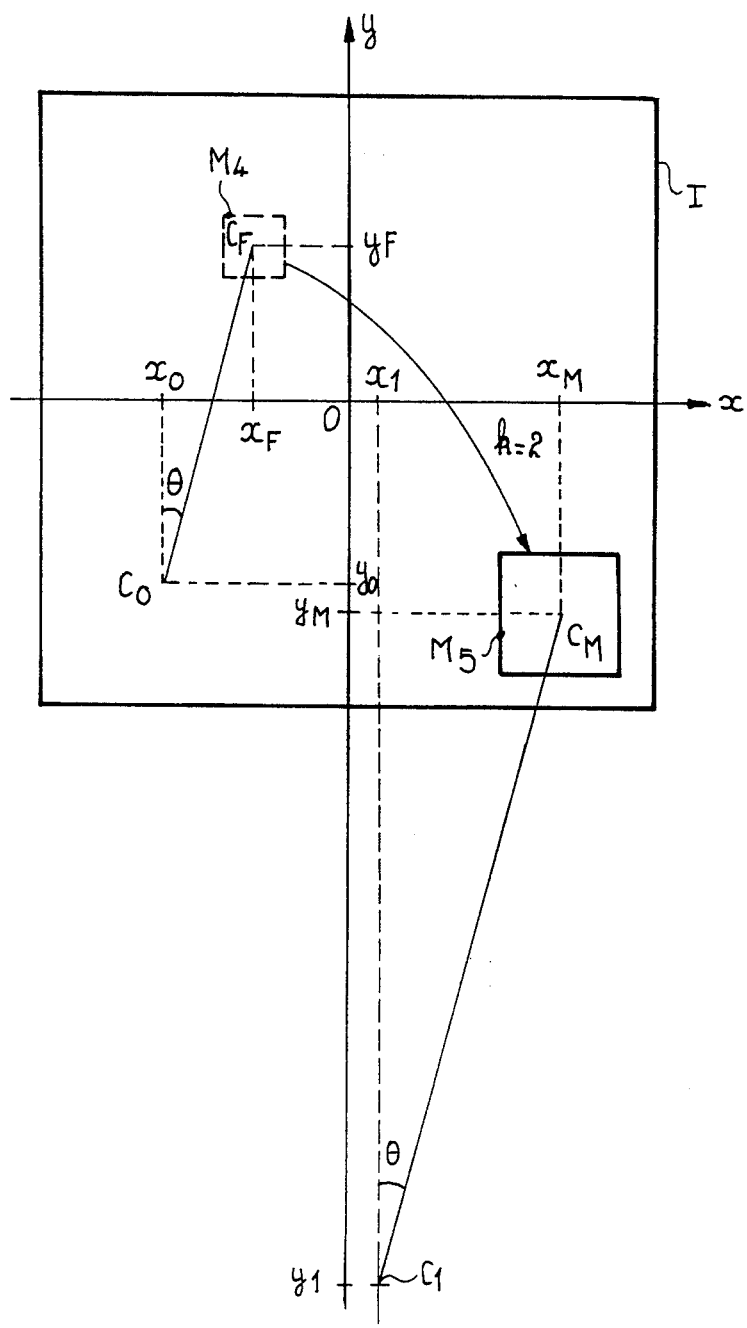

FIG_5
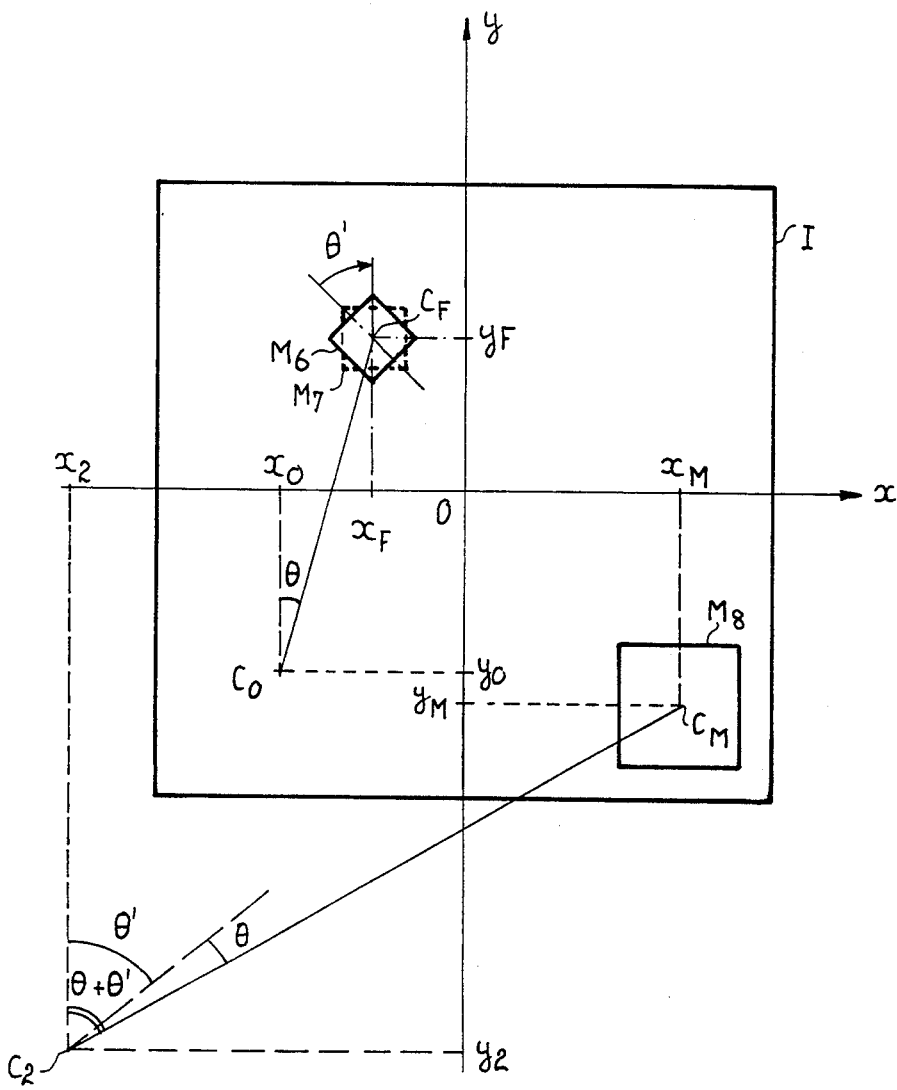

FIG_6
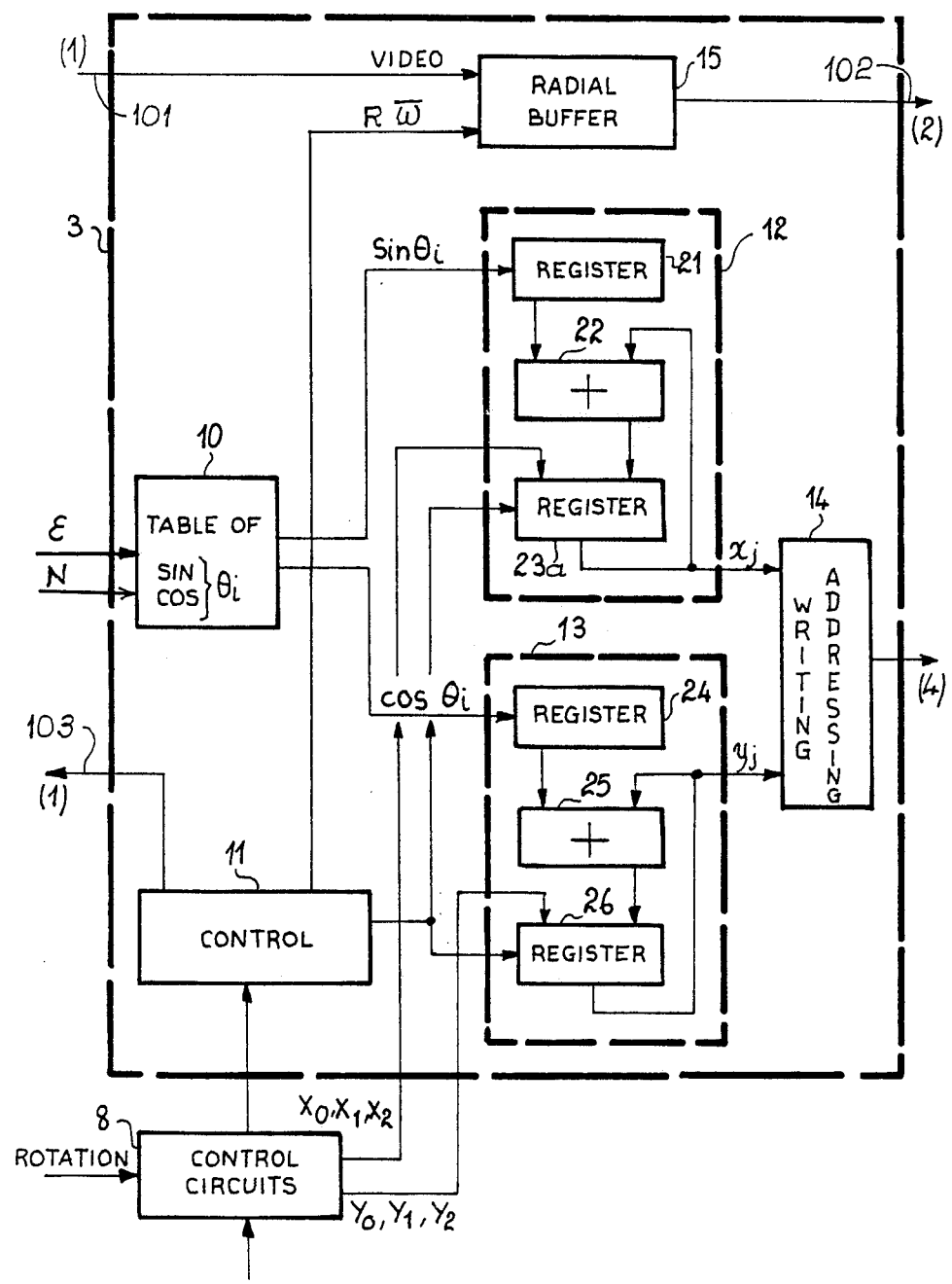

PROCESS AND APPARATUS FOR THE INSERTION OF INSETS INTO THE IMAGE SUPPLIED BY A DIGITAL SCAN CONVERTER

BACKGROUND OF THE INVENTION

The present invention relates to a digital image scan converter or D.I.C. It more specifically relates to a process for the insertion of magnified insets into the image supplied by such a D.I.C., as well as to the D.I.C. for performing this process.

The essential function of a D.I.C. is to convert an image supplied in polar coordinates and which is relatively slowly renewable into a bright television-type image or picture, thereby permitting its exploitation in an illuminated ambient. This slowly renewable image is generally a radar image, but it can also be an image from a sonar, an infrared sensor, an echo sounding system or the like, which can be displayed on a screen operating in the television mode.

FIG. 1 shows the block diagram of a D.I.C. in the case of a radar. The D.I.C. comprises the following components:

A television monitor 7 on which the radar information is displayed.

An image memory 4 containing in digital form the image to be displayed on the monitor 7. The capacity of memory 4 is adapted to the television standard used, i.e. it must have the same number of storage positions as the image displayed on the television monitor has points (or pixels). In addition, the brightness of each point is coded by means of a certain number of bits, e.g. three bits authorizing eight brightness levels for each point. The reading phase of the content of memory 4 intended for the television monitor 7 and the phase of writing into the memory the radar information supplied by an assembly 2 are asynchronous. Reading has priority and writing is stopped during a reading phase.

An assembly 1 of circuits is provided for processing the radar video signals received by the D.I.C. It is pointed out that analog video signals are constituted on the one hand by a sync signal ($S_T$) indicating that a pulse has been emitted by the radar, and on the other hand by the actual video ($\rho$), constituted by all the responses (echos) to said pulse. Assembly 1 in particular ensures the conversion of the incident analog video signal into digital form signal, the processing of said signal, whose details are variable as a function of the radar type, and the storage of the video information corresponding to each radar pulse, called radial sweep.

An assembly 3 of coordinate conversion circuits is needed because the radar information, which is generally supplied in polar coordinates, has to be written onto the television screen 7 in Cartesian coordinates. For this purpose, assembly 3 receives the signals representing the rotation of the radar antenna, i.e. indicating at all times the angular position of the beam of the radar (radar antenna) with respect to a reference direction, generally North. The rotation signals are on the one hand constituted by a north signal (N), which is a pulse signal supplied during each passage of the beam through North and on the other hand by an angle increment signal ($\epsilon$) indicating that the beam has turned by an nth of a turn with respect to the preceding increment, if n increments correspond to 360°. Thus, assembly 3 ensures the addressing of the image memory 4, whereby the processing assembly 1 supplies via an assembly 2, the information to be written into the image memory 4, synchronously with the addressing.

An assembly 5 of television mode reading circuits ensures the read addressing of the image memory 4.

An assembly 6 of television mode output circuits receives the information stored in the image memory 4 and as addressed by assembly 5, ensures the digital-analog conversion to produce the television video signal intended for monitor 7, as well as the generation of conventional television sync signals.

An assembly 2 of artificial persistence or afterglow circuits, whose function is to produce for the digital information stored in memory 4 for which there is no modification due to aging, a persistence effect comparable to that produced on a tube where the brightness of a point starts to decrease as soon as it is written.

An assembly 8 of control circuits, e.g. realized by means of a microprocessor, receives both the radar video signals and the rotation signals and ensures the control and synchronization of all the aforementioned assemblies, apart from the monitor 7.

Thus, after converting the scanning standard (polar into Cartesian), the image memory 4 contains the image as it will be displayed on the television monitor 7, this image then being called the basic image.

The problem which is often encountered by the operator is that of wishing to magnify one or more areas of said basic image, where an important detail requires examination. These magnified areas are called "insets".

FIGS. 2a and 2b show an example of the display of an area monitored by a radar. In FIG. 2a, a circle indicates the range P of a radar located at a point $C_o$, forming the center of the circle P. Of the area P covered by the radar, only a part is displayed in the form of an image I as shown in FIG. 2b. For example, the displayed part in FIG. 2b shows an airport having runways and taxiways along which are travelling two aircraft $A_1$ and $A_2$.

In exemplified manner, it is possible to magnify those areas of the basic image I surrounding aircraft $A_1$ and $A_2$ to respectively form insets $M_2$ and $M_3$ which are preferably inserted in those parts of the basic image I not useful to the operator. It should be noted that the surface of the magnified parts and their magnification are not necessarily the same for each inset. Moreover, still in exemplified manner, an inset $M_1$ is inserted in image I from part of the area P covered by the radar not included in the displayed portion I. The surface and magnification coefficient of said inset $M_1$ are also of a random nature compared with those of other insets.

It is known to obtain such a partial magnification by expansion, during the reading of the image memory, of an area of the image supplied by the memory, each of the points intended to be part of the inset then being repeated identically thereto k times, if k is the sought magnification coefficient. This method is known as "zoom". It has the drawback of not improving the definition of the observed magnified area and consequently the overall definition of the inset is very inferior to that of the remainder of the basic image.

SUMMARY OF THE INVENTION

An object of the present invention is a process which produces the inset during the writing of the video information into the image memory, which makes it possible to increase the definition of the inset. The image memory then contains both the basic image and the insets, the latter being stored with the desired coordinates (Cartesian coordinates) and magnification. The Cartesian coordinates of the points of each inset are obtained by modifying data used for the conversion of coordinates of the basic image by the conversion assembly 3. The desired magnification is obtained by corresponding modification of the sampling period of the analog video information during its conversion into digital form by assembly 1, which makes it possible to increase the definition of the inset compared with the basic image.

BRIEF DESCRIPTION OF THE DRAWINGS

The invention is described in greater detail hereinafter relative to non-limitative embodiments and the attached drawings, wherein there is shown:

FIG. 1, already described, the block diagram of a D.I.C.

FIGS. 2a and 2b already described, an example of a basic image having insets which can be displayed by a D.I.C.

FIG. 3, an embodiment of part of FIG. 1.

FIGS. 4 and 5, two diagrams explaining the conversion of the coordinates used for the insets.

FIG. 6, an embodiment of another part of FIG. 1.

In the various drawings, the same references relate to the same elements.

DETAILED DESCRIPTION OF THE PREFERRED EMBODIMENTS

Figure 7:
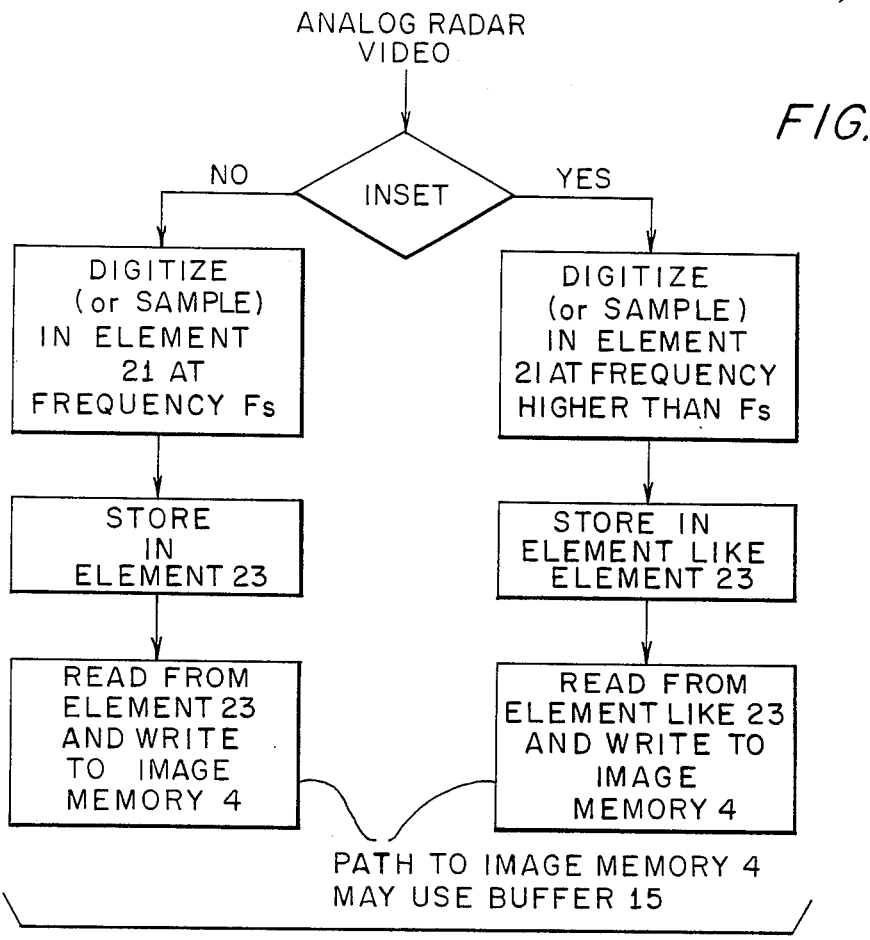
Figure 8:
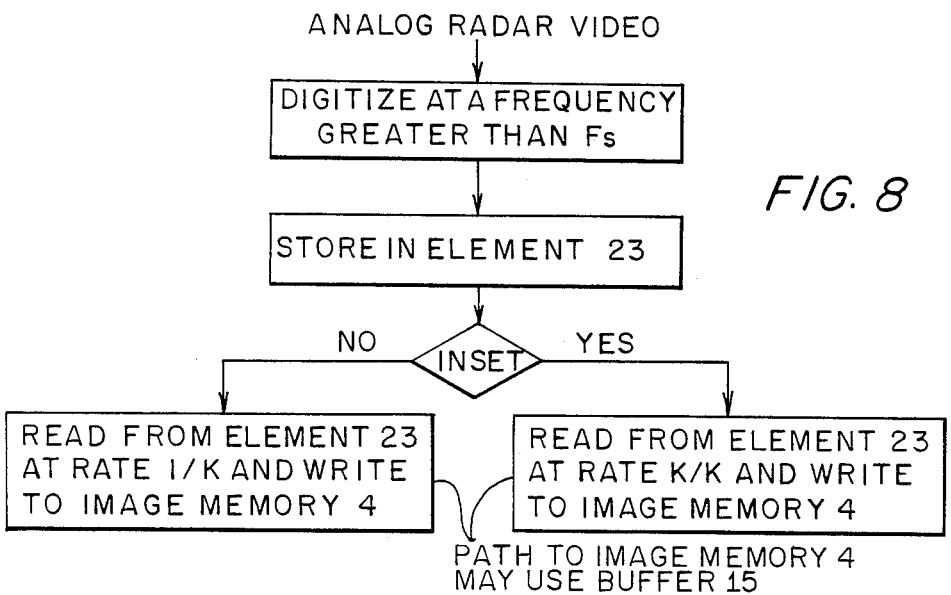
Figure 9:
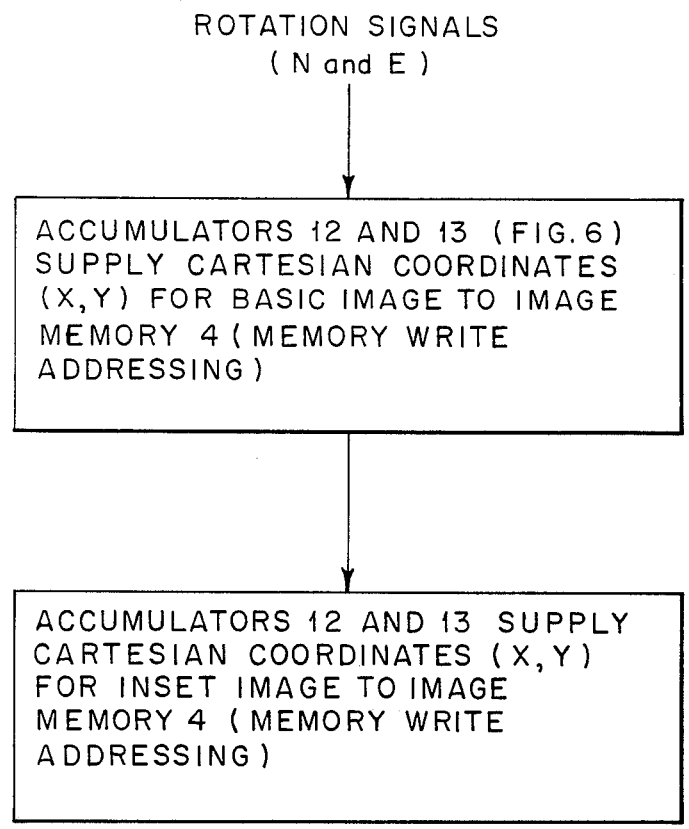

As will be described hereafter, FIG. 1, in full lines, shows a conventional image converter. The dotted leads 101, 102, 103 as well as the elements 1 and 3 (shown in more detail in FIGS. 3 and 6) are descriptive of the present invention.

FIG. 3 shows an embodiment of the radar video signal processing group 1. It comprises a circuit 21 (i.e., sampling circuit) for sampling the analog video signal received from the radar, which supplies said video in digital form to an assembly of circuits 22 (i.e., mixing dosing circuit).

It should be noted that an assembly such as 1 can receive several video signals from a radar. Assembly 22 also receives digital video signals from the same radar (e.g. cartography data, see the legend "Digital Radar Videos" in FIG. 3) and ensures the mixing and dosing of all these information, which it then transmits to a so-called radial memory 23, which thus contains the processed, digitized video signal relative to a radar pulse. In a variant, assembly 1 can contain several alternately functioning radial memories. Circuits 21, 22 and 23 (i.e., sampling circuit 21, mixing dosing 22 and radial memory 23) function under the action of a processing control circuit 24, which is itself related to the control assembly 8 (FIG. 1).

According to the invention, image memory 4 stores both the basic image and the desired insets with the desired magnification. For this purpose, two variants are provided.

According to the first variant, the processing assembly 1 comprises at least one radial memory for the radar pulses of the basic image and one radial memory for each of the insets to be produced (not shown in FIG. 3). The total number of insets possible in an image is accordingly defined by the number of radial memories allocated to the insets in the system. The radial memory of the basic image contains the digitized video signal processed in a conventional manner. The radial memory of each inset contains that part of the video signal related to the inset and sampled so as to be stored at a frequency higher than that of the basic image and corresponds to the desired magnification, e.g. double the frequency for a magnification of 2.

According to the second variant, assembly 1 only contains a single radial memory in which the video information is stored with the maximum available definition in the system. If K is the maximum desired magnification for an inset, the data for forming the basic image will be picked up in one storage position per group of K radial storage positions (1/K).

For an inset of magnification k, the information will be picked up k times on K positions (k·1/K), with $1 \leq k \cdot \leq K$.

The sampling frequency (circuit 21) and the definition of the basic image consequently fix the maximum possible magnification K for the insets.

The coordinate conversion assembly 3 (FIG. 1) has to carry out a conventional conversion for the basic image and also a specific conversion for each of the insets.

FIG. 4 shows an image I, such as is stored in the image memory and as will appear on the television monitor. For example, on said image I, the center $C_o$ of the radar (of Cartesian coordinates $x_o$ and $y_o$) does not coincide with the center O of the displayed image I. The area to be magnified is designated $M_4$ and its center $C_F$ has the Cartesian coordinates $x_F$ and $y_F$. Line $C_oC_F$ forms an angle $\theta$ with axis Oy. This area $M_4$ will form an inset $M_5$, where the coordinates of center $C_M$ are respectively $x_M$ and $y_M$. On calling k the magnification coefficient of inset $M_5$ and $C_1$, of coordinates $x_1$ and $y_1$, the position which will be occupied by the center of the radar $C_o$ for inset $M_5$ is:

$$C_1 \begin{cases} x_1 = x_M - k \cdot (x_F - x_o) \\ y_1 = y_M - k \cdot (y_F - y_o) \end{cases}$$

FIG. 5 is a diagram identical to that of FIG. 4, except the area at which an inset is to be formed also undergoes rotation by a given angle $\theta'$.

Thus, compared with FIG. 4, FIG. 5 has the following modifications. Area $M_6$ from which an inset is to be made has, for example, the same center $C_F$ and the same dimensions (e.g. a square) as area $M_4$ in FIG. 4, but its axis of symmetry passing through the center of the sides forms an angle $\theta'$ with axis Oy. It is desired to subject it to a rotation $\theta'$ in order to bring the aforementioned axis parallel to axis Oy. This area which has undergone a rotation $\theta'$ is shown dotted in FIG. 5 and designated $M_7$. The inset corresponding to area $M_6/M_7$ is designated $M_8$ and has as its center point $C_M$, as hereinbefore. $C_2$ designates the position of center $C_o$ relative to inset $M_8$. Coordinates $x_2$ and $y_2$ of point $C_2$ are given by the following formulas:

$$C_2 \begin{cases} x_2 = x_M - k \cdot \rho \cdot \sin(\theta + \theta') \\ y_2 = y_M - k \cdot \rho \cdot \cos(\theta + \theta') \end{cases}$$

with $$\rho = (x_F - x_o)^2 + (y_F - y_o)^2 \text{ and } \theta \tan^{-1} \frac{x_F - x_a}{y_F - y_o}$$

FIG. 6 shows an embodiment of the coordinate conversion assembly 3 of FIG. 1. FIG. 6 also shows the control assembly 8, which receives the information concerning the desired inset or insets from the operator.

The coordinate conversion assembly 3 comprises the following parts:

An assembly 11 of conversion control circuits associated with the control assembly 8 and providing an output 103 to control the processing element 1.

A table 10 of the different values of the trigonometric functions, e.g. the sine and cosine of each of the angles $\theta_i$ (i varying from 1 to n) respectively defining the n radar pulses, said table being constituted by a memory, addressed by the angle increments $\epsilon$, for example, and reset by the N signal.

An accumulator 12, receiving from the aforementioned table 10 the value $\sin \theta_i$ and from the control assembly 8 the coordinate $x_o$ of the center $C_o$ for the basic image, $x_1$ or $x_2$ for the centers $C_1$ or $C_2$ of an inset. Accumulator 12 comprises an adder 22 surrounded by an input register 21, which receives for each radial sweep the value of $\sin \theta_i$, as well as an output register 23, which receives the initial coordinate of the radar input ($x_o$, $x_1$ or $x_2$). The output of the register 23 on the one hand supplies the current coordinate $x_j$ along the radial sweep during the accumulations and on the other hand is also directed towards the adder 22. Accumulation is initiated by the conversion control assembly 11. The accumulator supplies the Cartesian coordinate $x_j = x_{j-1} + \sin \theta_i$ during each accumulation step and for the same value of $\theta_i$, i.e. for the same radial sweep.

An accumulator 13, identical to accumulator 12, i.e. comprising an adder 25 surrounded by an input register 24 and an output register 26, performs an accumulation in cosine and supplies the Cartesian coordinate $y_j = y_{j-1} + \cos \theta_i$.

A writing addressing device 14 selects an address in image memory 4 where the video information is to be written.

According to a variant shown in FIG. 6 conversion assembly 3 also comprises a buffer memory 15, positioned between the radial memory 23 (of processing assembly 1) and the persistence assembly 2. In this case, the conversion control circuit 11 controls in a first step the reading of the radial memory 23 (with the appropriate definition) and the writing of said information into the buffer 15 via conductor 101. In a second step, the circuit 11 controls the reading of the buffer 15 over conductor 102 intended for the image memory 4 (via the assembly 2) synchronously with the writing addressing of said memory 4.

In the case where the number of desired insets and the arrival rate of the radar information to be displayed are compatible with the accumulation speed of conversion assembly 3, a single set of accumulators is sufficient to ensure the conversions of the relative coordinates successively of the basic image and the inset or insets. In this case, according to a preferred embodiment, the operation of the device of FIG. 6 takes place in two steps for each radial sweep, being characterized by an angle $\theta_i (1 \leq i \leq n)$.

In a first step, accumulators 12 and 13 supply the current coordinates $x_j$ and $y_j$ of a radial sweep (from the position of radar $C_o$ to the periphery of the TV display) for the basic image, from corrdinates $x_o$ and $y_o$ supplied by the control assembly 8. Synchronously and supervised by assembly 8, the video information relating to the basic image and stored in the radial memory 23 (FIG. 3) or in the buffer 15 (FIG. 6) is written into the image memory 4 at addresses $x_j$, $y_j$. During this writing step video data is transferred at the rate of 1/K. However, in order to avoid any disturbance to the persistence mechanism (assembly 2 FIG. 1), the writing of the basic image into image memory 4 is inhibited in the area ($M_5$, $M_8$) of image I where the inset is to be written in. This may be brought about by inhibiting the transfer of the video relative to the basic image into the image memory, i.e. there is no reading at that time of the content of the radial memory or the buffer store under the control of assemblies 8 or 11, the conversion of the coordinates being continued normally during this time. This may be also brought about by the non-operation of the accumulators in the area $M_5$ or $M_8$ in question, under the control of circuits 8 and 11. In this latter case, it is then necessary to reinitialize the accumulators (registers 23a and 26) at the output of areas $M_5$ and $M_8$.

In a second step and for the same radial sweep, accumulators 12, 13 supply the current coordinates $x_j$ and $y_j$ for the inset, from the coordinates $x_1$ and $y_1$ (or $x_2$ and $y_2$) supplied by the control assembly 8. As hereinbefore, synchronously the content of the radial memory (or the buffer) relating to the inset is written into the image memory at addresses $x_j$ and $y_j$. During this writing step video data is transferred at the higher rate k/K. As hereinbefore and in the same way, writing of information relative to the inset only takes place for the coordinates corresponding to areas $M_5$ or $M_8$.

When the rate of the radar information or the number of insets increases, several assemblies such as 3 are needed, one being allocated to the basic image and the other or others to the different insets. The control assembly 8 then ensures the switching between the different assemblies respectively working on the basic image and on the insets. In this embodiment, it is simpler to provide a buffer 15 in each assembly 3.

In the embodiment described hereinbefore, the image memory 4 contains the basic image into which the inset are directly inserted. One advantage of this solution is a memory space economy. Its disadvantage is that is requires an inhibition of the writing of the basic image, the image memory 4 with regard to the areas where an inset is to be formed.

In another embodiment, the image memory 4 contains both the complete basic image and the inset or insets in supplementary memory spaces. It should be noted that the writing into the image memory here again takes place by one or more conversion assembly 3. The display on monitor 7 of an image in which the insets are inserted at the desired location is then carried out by the reading assembly 5, under the control of assembly 8, assembly 5 ensuring the reading of the appropriate information by the control of the reading addresses of the image memory.

The above description has been given in a non-limitative manner. Thus, a coordinate conversion calling on sine and cosine trigonometric functions has been described. However and as is known, said conversion can also be carried out with the tangent function, the same considerations regarding the speed and number of accumulators again applying.

What is claimed is:

1. A process for insertion of an inset image portion into an image generated by a digital image converter including a television type image display, an image memory storing, in digital form, a basic image to displayed on the television type display, processing means including storage means for sampling and storing video information as the video information is supplied to the digital image converter, coordinate conversion means for generating Cartesian coordinates for the video information which is supplied to the digital image converter in accordance with polar coordinates, said process including the steps of:

sampling video information received by the digital image converter, including sampling video information for said basic image at a first frequency and sampling video information for said inset image portion at a second frequency, higher than said first frequency, storing video information associated with an inset image portion in said storage means with a magnification factor k relative to said basic image, where k>1, generating coordinates for an inset image portion employing parameters which are functions of a desired position for the inset image portion in the basic image and the magnification factor k for the inset image portion, and writing said video information associated with an inset image portion from said storage means to said image memory at addresses in said image memory defined by coordinates produced in said generating step.

2. A process as recited in claim 1 wherein:

said storing step also stores video data associated with the basic image in said storage means, and wherein said basic image has a definition which is a function of a maximum magnification factor K for any inset image portion, said writing step writes video data associated with said basic image to said image memory at a rate 1/K and wherein video data associated with said inset image portion is written to said image memory at a rate of k/K.

3. A process as recited in claim 1 wherein said generating step includes a video data rotation function for rotating video data associated with an inset image through an angle forming one of the parameters used in the generating step.

4. A process as recited in either claim 1 or 2 or 3 wherein said image memory includes a region dedicated to said basic image and a separate region dedicated to said inset image portion, said process including a further step of creating said image by reading said image memory at said region and at said separate region.

5. A process as recited in claim 1 or 2 or 3 wherein said writing said image memory with video data associated with said basic image is inhibited with respect to regions of the basic image which are to be occupied by an inset image portion.

6. A digital image converter for insertion of an inset image portion into a basic image defined by video image data supplied to said digital image converter including a television type image display, an image memory storing, in digital form, a basic image to displayed on the television type display, processing means including storage means for storing video information as the video information is supplied to the digital image converter, coordinate conversion means for generating Cartesian coordinates for the video information which is supplied to the digital image converter in accordance with polar coordinates, said processing means including means for sampling received video information, said means for sampling, sampling video image data for a basic image at a first frequency and sampling video image data for an inset image portion at a second, higher frequency, and means responsive to said sampling means for storing video information associated with an inset image portion in said storage means with a magnification factor k relative to said basic image, where k>1, said coordinate conversion means including means for generating coordinates for an inset image portion employing parameters which are functions of a desired position for the inset image portion in the basic image and the magnification factor k for the inset image portion, and said digital image converter further including means for writing said video information associated with an inset image portion to said image memory at addresses in said image memory defined by coordinates produced in said means for generating.

7. Apparatus as recited in claim 6 wherein:

said means for generating includes buffer means for storing video information associated with an inset image portion and responsive to said storage means.

8. Apparatus as recited in claim 7 wherein said coordinate conversion means and said means for generating includes:

basic generating means for generating Cartesian coordinates for said basic image, and second generating means for generating Cartesian coordinates for an inset image portion, said basic generating means including a basic buffer means and said second generating means including said buffer means, both said basic and buffer means each responsive to said storage means for storing respective portions of the video data stored in said storage means.

9. A process for insertion of an inset image portion into an image generated by a digital image converter including a television type image display, an image memory storing, in digital form, a basic image to displayed on the television type display, processing means including storage means for sampling and storing video information as the video information is supplied to the digital image converter, coordinate conversion means for generating Cartesian coordinates for the video information which is supplied to the digital image converter in accordance with polar coordinates, said process including the steps of:

(a) sampling video information received by the digital image converter, (b) storing video information associated with an inset image portion in said storage means with a magnification factor k relative to said basic image, where k>1, (c) generating coordinates for the basic image, (d) generating coordinates for an inset image portion employing parameters which ae functions of a desired position for the inset image portion in the basic image and the magnification factor k for the inset image portion, (e) writing, at a first rate, said video information associated with an inset image portion from said storage means to said image memory at addresses in said image memory defined by coordinates produced in said step (d), and writing, at a second rate, lower than said first rate, said video information associated with a basic image from said storage means to said image memory at addresses in said image memory defined by coordinates produced in said step (c).

10. A process as recited in claim 9 wherein:
said second rate is proportional of 1/K, where K represents maximum magnification of any inset image portion relative to said basic image and wherein said first rate is proportional to k/K.

11. A process as recited in claim 9 wherein said step (d) includes a video data rotation function for rotating video data associated with an inset image through an angle forming one of the parameters used in the step (d).

12. A process as recited in either claim 9 or 10 or 11 wherein said image memory includes a region dedicated to said basic image and a separate region dedicated to said inset image portion, said process including a further step of creating said image by reading said image memory at said region and at said separate region.

13. A process as recited in claim 9 or 10 or 11 wherein said writing said image memory with video data associated with said basic image is inhibited with respect to regions of the basic image which are to occupied by an inset image portion.

14. A digital image converter for insertion of an inset image portion into a basic image defined by video image data supplied to said digital image converter including a television type image display, an image memory storing, in digital form, a basic image to displayed on the television type display, processing means including storage means for storing video information as the video information is supplied to the digital image converter, coordinate conversion means for generating Cartesian coordinates for the video information which is supplied to the digital image converter in accordance with polar coordinates,
wherein said processing means includes means for sampling received video information, and
means responsive to said sampling means for storing video information associated with an inset image portion in said storage means with a magnification factor k relative to said basic image, where k>1,
wherein said coordinate conversion means includes means for generating coordinates for a basic image and for an inset image portion, said means for generating coordinates for said inset image portion employing parameters which are functions of a desired position for the inset image portion in the basic image and the magnification factor k for the inset image portion, and said digital image converter further including:
means for writing said video information associated with an inset image portion to said image memory at a first rate at addresses in said image memory defined by coordinates produced in said means for generating and for writing said video information associated with a basic image to said image memory at a second rate, lower than said first rate, at addresses in said image memory defined by coordinates produced in said means for generating.

15. Apparatus as recited in claim 14 wherein:
said means for generating includes buffer means for storing video information associated with an inset image portion and responsive to said storage means.

16. Apparatus as recited in claim 15 wherein said coordinate conversion means and said means for generating includes:
basic generating means for generating Cartesian coordinates for said basic image, and
second generating means for generating Cartesian coordinates for an inset image portion,
said basic generating means including a basic buffer means and said second generating means including said buffer means, both said basic and buffer means each responsive to said storage means for storing respective portions of the video data stored in said storage means.

* * * * *